Patented Mar. 17, 1931

1,797,095

UNITED STATES PATENT OFFICE

HERBERT J. KRASE, OF CLARENDON, VIRGINIA; HARRY C. HETHERINGTON, OF WASHINGTON, DISTRICT OF COLUMBIA; AND LOUIS A. PINCK, OF PASSAIC, NEW JERSEY; ASSIGNORS TO ARTHUR B. LAMB, TRUSTEE

FERTILIZER MATERIAL

No Drawing. Application filed March 2, 1926. Serial No. 91,834.

This invention relates to fertilizer materials containing urea and ammonia nitrogen in variable amounts, together with an acid radical which may itself be a plant food, and a method of manufacturing same. The materials and the method of obtaining them are described in the following specification.

When carbon dioxide compounds of ammonia, viz., ammonium carbamate, carbonate or bicarbonate are heated in a closed vessel or autoclave, urea is formed, but, as is well-known, only a part of the materials undergo this conversion, so that a mixture of the materials used, with urea and water, is obtained. About 40 per cent conversion is usually obtained in the urea autoclave when ammonium carbamate is use, consequently about 60 per cent of the ammonia introduced into the urea autoclave must be recovered from the urea and water.

Previous methods for the utilization of the ammonia unconverted to urea have required that the ammonia be first distilled off from the sludge discharged from the autoclave.

Now, we have discovered that a fertilizer of high nitrogen content containing both urea and an ammonium salt having highly desirable physical properties, may be prepared directly from the charge released from the autoclave, thus partly or wholly eliminating the aforesaid distillation. This is accomplished by neutralizing with an appropriate acid, all or part of the free ammonia contained in the charge. As an acid, sulphuric, phosphoric, hydrochloric or nitric may be used and in the case of phosphoric or nitric acid, additional fertilizing value obtained.

In order to illustrate our invention, the following examples are cited:

1. If the urea conversion amounts to 40 per cent of the theoretical conversion, and all the ammonia unconverted to urea is neutralized by phosphoric acid to give mono-ammonium phosphate and then the moisture evaporated, the dry material obtained will analyze approximately as follows:

| | Per cent |
|---|---|
| Total NH$_3$ | 21.0 |
| Total P$_2$O$_5$ | 52.6 |

This material will contain approximately 40 per cent of its nitrogen as urea, while the remainder will be there as mono-ammonium phosphate, thus establishing a ratio of ammonia to phosphorus pentoxide of 1 to 2.5, while the total plant food content will be 73.6% of the weight of the mixture.

2. In case it is desired to make a salt containing a ratio of ammonia to phosphorus pentoxide of 1 to 2, we find that if the urea conversion amounts to 40 per cent and if we distill off 37.5 per cent of the unconverted ammonia, by neutralizing to mono-ammonium phosphate and drying, we obtain a solid containing approximately 24 per cent equivalent ammonia and 48 per cent phosphorus pentoxide or a total of 72 per cent plant food. The recovery and conversion to urea of the distilled ammonia may be accomplished by any suitable method but preferably the method described in our co-pending application entitled, Manufacture of urea, Serial No. 91,831, filed March 2, 1926. By distilling more than 37.5 per cent of the ammonia, a smaller amount of phosphoric acid may be added and a correspondingly lower ratio of phosphoric anhydride to ammonia obtained.

3. In case the urea autoclave is yielding a conversion of 50 per cent, we find that by neutralizing all the unconverted ammonia with phosphoric acid, we may obtain a solid product analyzing approximately 23.5 per cent ammonia, of which 50 per cent is urea ammonia and 50 per cent is ammonium phosphate ammonia, and 48.7 per cent phosphorus pentoxide. The plant food content will amount to a total of 72.2 per cent of the weight.

Another feature of this invention is the fact that the NH$_3$—P$_2$O$_5$ is capable of wide variation by a slight change in operating conditions. If it is desired to produce salt mixtures containing a relatively high P$_2$O$_5$ content, it is possible to add the proper amount of phosphoric acid to the charge from the autoclave, even if the phosphoric acid is there in greater excess than necessary to neutralize all of the free ammonia, since the urea will admirably serve the same purpose by the formation of urea phosphate. By neutralizing all the ammonia with phosphoric acid, and adding enough phosphoric acid in excess to produce urea phosphate, one obtains a fertilizer of the following approximate composition, providing a 40 per cent conversion is obtained in the urea autoclave:

|  | Per cent |
|---|---|
| Total $NH_3$ | 16.9 |
| Total $P_2O_5$ | 56.5 |

Of the total ammonia, 2/5 is present as urea phosphate.

By this process, it is possible to make a fertilizer with any desired combination of the two plant foods, ammonia and phosphorus pentoxide, from that represented by combinations containing nearly all the ammonia in the form of urea, the phosphorus pentoxide being combined with the accompanying small amount of ammonia, to that in which all the urea and ammonia from the urea synthesis system is neutralized by phosphoric acid. This last composition, in the case of a urea synthesis system, yielding a 40 per cent conversion to urea, is given above. It is also possible to vary the amount of conversion in the urea autoclave from the 40 to 50 per cent cited to lesser amounts and in this way obtain other variations in composition.

If it is desired to produce a fertilizer containing nitrate nitrogen, as well as ammonia and urea nitrogen, it is only necessary to neutralize the unconverted ammonia with nitric acid. An excess of nitric added in this manner will form urea nitrate. A considerable latitude in the ratio of urea nitrogen to ammonia and nitrate nitrogen is also possible.

We claim:

1. The process of producing a concentrated fertilizer containing urea and ammonia by securing a desired unconverted ammonia content in the product discharged from an ammonia carbon-dioxide urea synthesis system and then treating with an acid.

2. The process of producing a concentrated fertilizer containing urea and ammonia by securing a desired unconverted ammonia content in the product discharged from an ammonia carbon-dioxide urea synthesis system, and then treating with an acid sufficient in quantity to form a salt of the ammonia unconverted to urea, and a salt of urea.

3. The process of producing a concentrated fertilizer containing urea and ammonia, together with phosphoric anhydride by neutralizing a part of the ammonia unconverted in an ammonia carbon dioxide urea synthesis system with phosphoric acid and recovering the product.

4. The process of producing a concentrated fertilizer containing urea and ammonia nitrogen, together with phosphoric anhydride by removing part of the ammonia unconverted to urea in an ammonia-carbon-dioxide-urea synthesis system, neutralizing the ammonia remaining in the sludge with phosphoric acid, with the formation of mono-ammonium phosphate, then recovering the resultant product.

5. The process of producing a concentrated fertilizer containing urea and ammonia nitrogen, together with phosphoric anhydride in various proportions by securing a desired ammonia content in the product obtained from an ammonia carbon-dioxide urea synthesis system and then treating with sufficient phosphoric acid to form, in addition to mono-ammonium phosphate with the ammonia, urea phosphate with part of the urea present.

6. The process of producing a concentrated fertilizer containing urea and ammonia, together with phosphoric anhydride by securing a desired ammonia content in the product obtained from an ammonia carbon-dioxide urea synthesis system, and then treating with phosphoric acid, and recovering the product substantially as described.

7. The process of producing a concentrated fertilizer containing urea and ammonia nitrogen, together with phosphoric anhydride in various proportions by securing a desired ammonia content in the product obtained from an ammonia carbon-dioxide urea synthesis system, and then treating with sufficient phosphoric acid to form in addition to mono-ammonium phosphate with the ammonia, urea phosphate with the urea present.

8. The process of producing a concentrated fertilizer containing urea and ammonia nitrogen, together with phosphoric anhydride in various proportions by removing part of the ammonia unconverted to urea in an ammonia carbon-dioxide urea synthesis system, neutralizing the ammonia remaining, together with urea with sufficient phosphoric acid to form mono-ammonium phosphate with the ammonia and urea phosphate with the urea.

9. The process of producing a concentrated fertilizer containing urea nitrogen and ammonia and nitrogen by neutralizing part of the ammonia unconverted to urea in an ammonia carbon-dioxide urea synthesis system with an acid.

HERBERT J. KRASE.
HARRY C. HETHERINGTON.
LOUIS A. PINCK.